W. H. COLLINS.
EGG SORTING DEVICE.
APPLICATION FILED SEPT. 18, 1913.
1,143,613.
Patented June 22, 1915.
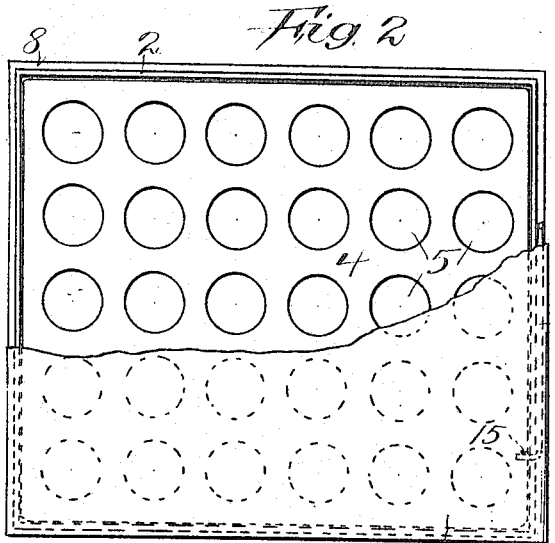
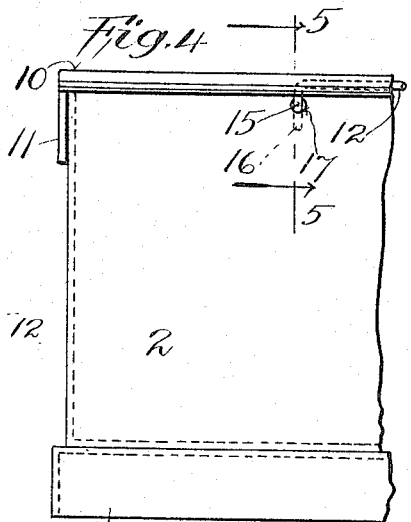
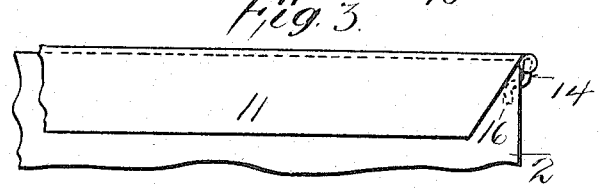
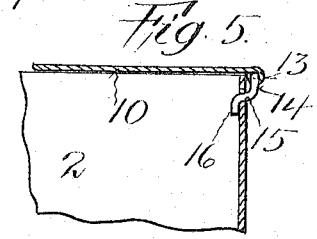
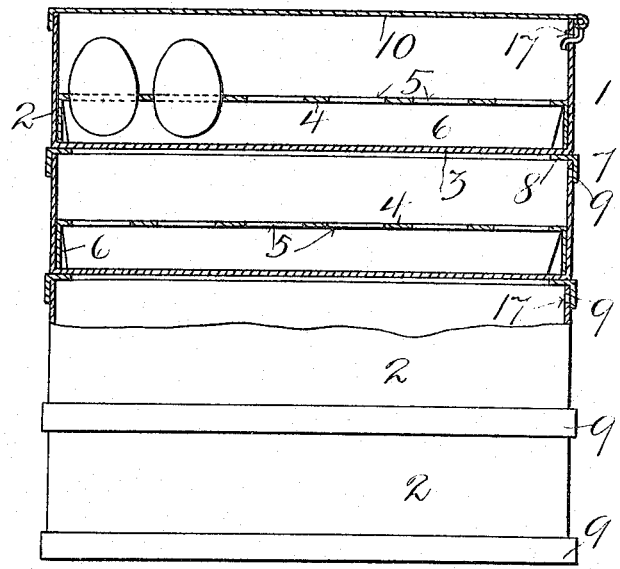

UNITED STATES PATENT OFFICE.

WALTER H. COLLINS, OF SUMMIT, NEW JERSEY.

EGG-SORTING DEVICE.

1,143,613.　　　　Specification of Letters Patent.　Patented June 22, 1915.

Application filed September 18, 1913.　Serial No. 790,439.

*To all whom it may concern:*

Be it known that I, WALTER H. COLLINS, a citizen of the United States, and a resident of Summit, in the county of Union and State of New Jersey, have invented certain new and useful Egg-Sorting Devices, of which the following is a specification.

My invention relates to egg sorting devices and more particularly to a device in which broken or cracked eggs commonly called leakers may be accumulated and stored. In places where eggs are received and shipped in large quantities a percentage of the eggs are usually found to be broken or cracked caused in shipment, and very often some of the eggs become cracked during handling or cradling at the places of receipt and shipment. If these broken eggs must be destroyed they naturally entail a total loss. They may, however, be entirely opened and their contents stored in suitable airtight receptacles for subsequent sale and use, provided that between the time the breakage is discovered, that is, when first examined after their receipt, and the time they are hermetically sealed in the permanent receptacles, they are kept and handled in a sanitary manner. It is almost impossible to keep the various places in which they are handled sufficiently sanitary to meet the approval of the public authorities; and to keep the places sufficiently sanitary and dust proof to be able to temporarily store the broken or cracked eggs in open receptacles.

The object of my invention is to provide a series or stack of receptacles which will be convenient for receiving the eggs which are found to be cracked, and which will retain them in a very sanitary condition until such time as it may be convenient to seal them in permanent receptacles. The device is not only very easily handled and convenient, but it permits of the temporary storage of a large number of such eggs in a compact space. Furthermore, the receptacles are such that they may be temporarily stored in a refrigerator until it is convenient to seal them in the permanent receptacles; and the eggs will at all times be protected from contamination.

The device consists of a series of independent receptacles which are so constructed that they may be arranged in a stack in superimposed relation. When the receptacles are stacked one on top of another as they are individually filled, one receptacle forms a top or closure for the one next below it; and so on throughout the stack. A removable cover is provided for the topmost receptacle; and this is removed from time to time and placed upon the receptacles which are added to the top of the stack from time to time.

In the drawings forming part of this application, Figure 1 is a side elevation of a stack of receptacles, embodying my invention, in which view parts are broken away to show the interior construction, Fig. 2 is a plan view thereof, in which a portion of the cover is broken away to show the interior, Fig. 3 is an elevation showing the hinge portion of the cover. Fig. 4 is a rear elevation of a portion of the receptacle. Fig. 5 is a sectional view, taken on the line 5—5 of Fig. 4, and shows the hinge, and, Fig. 6 is a perspective view of a portion of the cover from the rear, showing the hinge.

The device consists of a plurality of independent receptacles which are preferably, though not necessarily, made in rectangular form. In Fig. 1 I have shown four of the receptacles or units stacked one upon the other in the manner in which they are placed as they are filled. Each receptacle 1 in the form here shown consists of the four walls 2, and a bottom 3; all of which is preferably made of sheet metal, such as zinc, either of one piece or of separate parts with closed seams. The top of each receptacle, when considered separate from the stack, is open. Within each receptacle there is provided means for separately holding a number of eggs in such a manner that any drip or leak from the cracked eggs will fall to the bottom and not contact thereafter with the eggs. This member in the present case, as well as the receptacle, are sanitary in the sense that the holder may be completely removed and sterilized; and, when removed, it leaves an unobstructed chamber in the receptacle which may be very thoroughly cleansed and sterilized. The holders herein each consist of a plate 4 provided with as many apertures 5 to receive and hold the eggs as the capacity of the receptacle will permit. These apertures are slightly less than the diameter of a comparatively small egg, so that all the eggs will be held above the bottom of the receptacle. The holder, in addition to the plate 4, comprises the depending flanges 6 around the several sides, which rest upon the bottom of the receptacle and support the plate 4 above it. These holders are readily removable, so that the holders and receptacles may be easily sterilized.

Each receptacle, or at least all above the lowermost one, is provided with a depending portion for overlapping a lower receptacle, so that a number of receptacles may be stacked. For this purpose I prefer to attach around the bottom edge of each receptacle a plate 7 consisting of a horizontal web 8, secured under the bottom; and a depending web 9 which is sufficiently extended to overlap the top edges of the receptacle next below, as shown in Fig. 1.

There is a removable cover, herein shown as consisting of a top plate 10 having depending flanges 11 around at least three of its sides, which overlap the top edges of the receptacle. The cover is attached by a separable hinge. This is shown herein as consisting of a wire rod 12 inclosed by the turned over edge 13 of the cover. At each end the rod extends through the cover edge, extends downwardly at 14, thence forwardly at 15 and again downwardly at 16. When the cover is placed upon the uppermost receptacle the ends of the rod are placed through the apertures 17 in the rear wall of the receptacle, and thereafter the cover will hinge on the parts 17 of the rod as the cover is opened and closed.

When using the device the user will start with one receptacle, to which the cover is attached. As the broken eggs are removed from a crate they are placed in the openings 5 in the holder of such lower receptacle, the cover being swung open each time eggs are placed in the receptacle. When the first receptacle becomes filled with the broken or cracked eggs the cover is removed therefrom by slipping the ends of the hinge rod out of the apertures 17. Another or second receptacle is then placed on top of the first one so that the flange 9 of this second receptacle entirely surrounds the top of the first receptacle. In this way one receptacle forms a closure for an adjacent one and they all stack firmly. The cover is now attached to the second receptacle, which is now on top, by inserting the hinge rod through the apertures 17 therein. The user now places the cracked eggs in the second and uppermost receptacle, using the cover each time to protect the contents. This may be repeated until a large number of receptacles are stacked one upon the other. The cover being attachable to each receptacle, it is removed each time the upper receptacle becomes filled and is replaced on the receptacle afterward added to the stack. It is to be noted that the flange 9 of one receptacle not only incloses the upper edges of the next lower one, but also closes the apertures 17 through which the hinge member is inserted.

When a stack has been completely or partially filled, the stack as a whole may be placed in a refrigerator until convenient to place the contents of the cracked eggs in a permanent and sealed container.

From the above it will be apparent that I have provided means for receiving and holding the eggs in a sanitary condition. The device is simple and convenient and occupies a comparatively small space; and the construction of the units permits of convenient stacking.

Having described my invention, what I claim is:

1. In a device of the class described, the combination of a plurality of receptacles for receiving a supply of eggs, and adapted to be stacked one upon the other so that one receptacle forms a top closure for the one next below, each of said receptacles having a depending flange extending around the same arranged to surround the top edge of the receptacle next below, each receptacle having apertures to receive a hinge member, the apertures of one receptacle being arranged to be closed by the depending flange of the receptacle above it, and a cover having a hinge member insertible in the apertures of the different receptacles, whereby said cover may be removed from one receptacle and be attached to a receptacle added to the stack.

2. In a device of the class described, the combination of a plurality of receptacles for receiving a supply of eggs, and adapted to be stacked one upon the other so that one receptacle forms a top closure for the next one below, each of said receptacles having a depending flange extending around the same and arranged to surround the top edge of the receptacle next below, each receptacle having apertures to receive a hinge member and a cover having hinge members insertible in the apertures of the different receptacles, whereby said cover may be removed from one receptacle and be attached to another, said hinge members comprising a rod extending downward, then forward and again downward.

Signed at the city, county and State of New York, this 13th day of September, 1913.

WALTER H. COLLINS.

Witnesses:
A. B. DOLLARD,
CHARLES G. HENSLEY.